Dec. 31, 1940.  A. KROES  2,226,727
RADIO RECEIVER
Filed March 24 1939
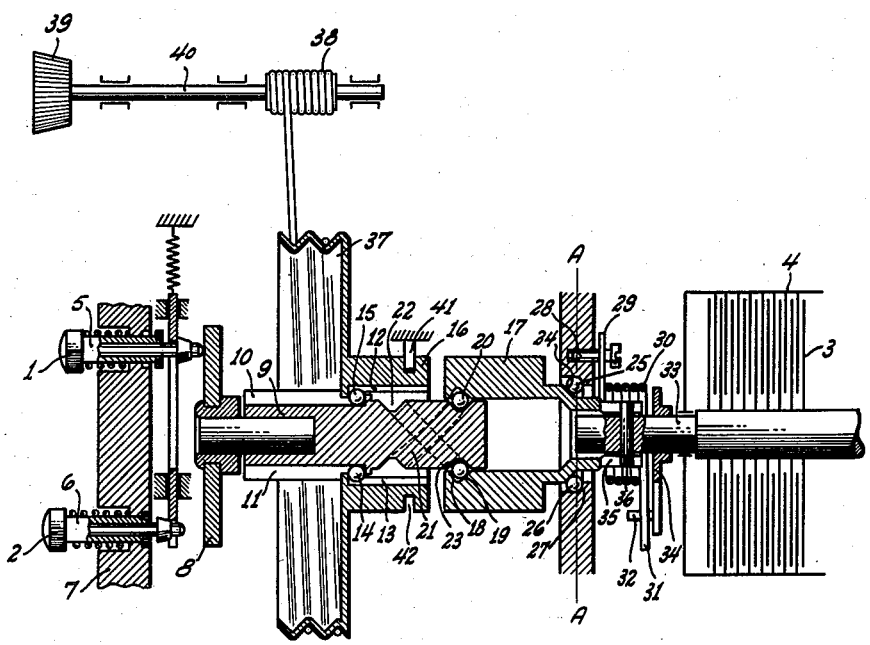
INVENTOR.
ALEX KROES
BY  H. S. Snover
ATTORNEY.

Patented Dec. 31, 1940

2,226,727

UNITED STATES PATENT OFFICE

2,226,727

RADIO RECEIVER

Alex Kroes, Eindhoven, Netherlands, assignor, by mesne assignments, to Radio Corporation of America, New York, N. Y., a corporation of Delaware Application March 24, 1939, Serial No. 263,835
In Germany April 4, 1938

9 Claims. (Cl. 74—89)

The invention relates to a radio-receiver wherein one or more switching or controlling members, more particularly tuning members, can be operated with the aid of one or more keys.

With the aid of the said keys the radio-receiver can be tuned, for example automatically, to a number of predetermined stations.

The apparatus according to the invention is characterised in that a rectilinear motion brought about by pressing-in a key is transformed by a helical transmission into a rotary motion of the switching or controlling members.

If, according to one advantageous form of construction of the apparatus according to the invention, between the co-operating portions of the helical transmission such bodies are arranged that rolling friction occurs in this transmission, one obtains the advantage that the distances over which the keys must be displaced to obtain the desired rotation of the switching or controlling members are only small. For, in this case it is possible to take a slight pitch of the transmission.

Such bodies may be formed, for example, by balls.

In the apparatus according to the invention the amount of play in the helical transmission is preferably suppressed by means of a spring. This spring may be in engagement, on the one hand, with a fixed point of the apparatus and, on the other hand, with a rotary portion of the helical transmission. The spring exerts on this rotary portion a torque whose sense, upon pressing-in the key, is opposite to the sense of rotation of the said portion. Owing to this arrangement one obtains the advantage that the spring may be utilised both for suppressing the play and for automatically restoring the switching or controlling members to their neutral positions.

In one favourable form of construction of the apparatus according to the invention, the screwthread of the co-operating portions of the helical transmission is so formed that each of the balls is in contact at three points with the helical transmission, a pure rolling motion of the balls in the transmission being thus ensured. According to the invention, at least the screwthread in one of the co-operating portions of the helical transmission may consist for this purpose of a helical groove of V-shaped cross-section. The screw-thread in the other co-operating portion may be similarly formed but may also have a U-shaped cross-section.

In a further advantageous form of construction of the apparatus according to the invention, an exactly rectilinear motion of that portion of the helical transmission which is actuated by the key is guaranteed by at least two balls which are each enclosed in two grooves of V-shaped cross-section which are located opposite one another and which extend axially, said grooves being provided in the said portion of the helical transmission and in a member which surrounds this portion.

A pure rotary motion of that portion of the helical transmission which actuates the switching or controlling members is preferably ensured by at least two balls which are enclosed in an annular path between the said portion of the helical transmission and the member which surrounds this portion.

If the switching or controlling members should be adapted to be also operated by hand, that is to say not with the aid of keys, one may proceed, in accordance with the invention, in such manner that the member which surrounds that portion of the helical transmission which is actuated by the key and which can be moved rectilinearly, is secured to a drum which, in the case of operation by hand, is turned. The rotary motion of the drum is transferred to the switching or controlling members by the balls which are each enclosed in the two axially extending grooves which are located opposite one another.

The invention will be explained more fully with reference to the accompanying drawing.

In the drawing, which represents diagrammatically one form of construction of that portion of the radio-receiver according to the invention which includes the helical transmission, this transmission is represented as a member by which the rectilinear motion of keys 1 and 2 is transformed into a rotary motion of the rotor 3 of a tuning condenser 4. It is evident that, if desired, other controlling or switching members such as potentiometers for volume- and bandwidth control, wavelength switches and the like may also be operated with the helical transmission shown.

Knobs 1 and 2 provided on pins 5 and 6 which are adjustable in length are arranged in a frame 7 and the lower ends of these pins co-operate with a plate 8 mounted on a shaft 9. This shaft has grooves 10 and 11 which extend axially and which form, jointly with corresponding grooves 12 and 13 of V-shaped cross section, a guide path for balls 14 and 15. When the bush 16 in which the grooves 12 and 13 are provided does not move the shaft 9 performs, when one of the keys 1 and 2 is pressed-in, an exactly rectilinear motion.

During this motion the balls 14 and 15 move in the paths which are formed by the grooves 10 and 12, on the one hand, and 11 and 13 on the other hand. The right-hand end of the shaft 9 is surrounded by a hollow bush 17 in which the said right-hand end of the shaft 9 can slide to and fro when it has been given the opportunity therefor. The bush 17 is provided on the inside with an annular ball race 18 in which fit balls 19 and 20. In this form of construction the right-hand end of the shaft 9 has two helical paths of which one is designated by a dotted line 21 whilst the ends of the other path are represented by recesses 22 and 23. At the right-hand end of the bush 17 there is provided a circular path 24 on which may roll balls 25 and 26 whose positions in the plane A—A are determined on the other hand by a stationary member 27 of the apparatus. Besides, this member 27 has screwed into it a pin 28 which is in contact with one end 29 of a helically wound spring 30 whose other end 31 is in contact with an extension 32 with which an arm 34 mounted on the condenser shaft 33 is provided. A rotary motion of the bush 17 is transferred to the shaft 33 by means of two axial grooves 35 in the bush 17 and of a pin 36 fitting into these grooves, which pin is secured in the condenser shaft 33. The bush 16 has secured thereto a drum 37 which, if the system is operated by hand, is actuated by means of a cord and through the intermediary of a roller 38 by a hand operating knob 39 provided on a shaft 40. A pin 41 which is arranged in the apparatus so as to be stationary and which engages a groove 42 in the bush 16 prevents the drum 37 from moving in the axial direction.

The above-described device operates as follows. Assuming that the friction in the cord-transmission between the roller 38 and the drum 37 is larger than that in the helical transmission, so that, upon operating one of the keys 1 and 2 (the number of which may be arbitrary), the groove 12 has to be considered as stationary, the plate 8 and therefore the shaft 9 move in the axial direction. As has previously been said, this axial movement is guaranteed by the co-operation of the balls 14 and 15 with the corresponding axial grooves in the shaft 9 and in the bush 16. The balls 19 and 20 consequently move in the two helical grooves 21 and 22, 23 in the right-hand end of the shaft 9 and this movement of the balls causes rotation of the bush 17. According to the distance over which the plate 8 has moved to the right (this distance being determined by the length of the operative portion of the pin of the key in pressed-in position) the bush 17 rotates through a larger or smaller angle. The rotary motion of the bush 17 is transferred by the pin 36, which engages both the grooves 35 and the condenser shaft 33, to the said shaft, which consequently is rotated through the same angle as the bush 17 and which gives the rotors 3 of the tuning condenser 4 a determined adjustment which corresponds to the correct tuning to the station corresponding to the key that has been pressed-in. The balls 29 in their guide paths 24 and 27 cause, also in co-operation with the balls 19 and 20, that the shaft 33 performs a pure rotary motion. During the rotary motion of the bush 17 the spring 30 is stretched. The tension of this spring causes that the total amount of play in the helical transmission is suppressed and, in addition, that the condenser is restored, if required, to its new position when another key is being pressed-in.

In the case of operation by hand by means of the knob 39 the drum 37 and therefore also the bush 16 with the grooves 12 and 13 provided therein are turned. The balls 14 and 15 carry the shaft 9 along with them and impart thereto a rotary motion which is transferred by the balls 19 and 20 to the bush 17 and therefore to the shaft 33. During the rotary motion of the bush 16 the pin 41 in the groove 42 causes that the said bush performs a pure rotary motion and consequently is not displaced in the axial direction.

What I claim is:

1. In a device of the kind described, a rotatable shaft, an axially adjustable helically slotted shaft, a coupling between the rotatable shaft and the helically slotted shaft, said coupling including means engaging the helical slot and cooperating therewith to impart rotary movement to said first named shaft through axial displacement of said slotted shaft, a driving plate mounted on said slotted shaft, a plurality of selectively operable means cooperating with said driving plate, each of said selectively operable means acting upon operation to effect the axial movement of said slotted shaft to a desired position.

2. The arrangement described in the preceding claim wherein each of said selectively operable means comprises a member adjustable with respect to said driving plate whereby each desired position may be adjustably predetermined.

3. The arrangement described in claim 1 wherein the helically slotted shaft is mounted coaxially with the axis of the rotatable shaft.

4. The arrangement described in claim 1 wherein returning means is provided for urging the rotatable shaft toward a predetermined home position.

5. In a device of the kind described, a rock-shaft, an axially adjustable helically slotted shaft, a coupling between the rock-shaft and the slotted shaft, said coupling including means in engagement with the helical slot and cooperating therewith to impart rotary movement to said rock-shaft through axial displacement of the slotted shaft, a plurality of individually operable means acting upon selective operation thereof to effect the axial movement of said slotted shaft to respectively different desired positions each of said individually operable means comprising a member adjustable with respect to said slotted shaft whereby said different desired positions may be individually and adjustably predetermined.

6. The arrangement described in claim 5 wherein rotatable means are mounted on said slotted shaft, said rotatable means acting upon rotation thereof to effect the adjustment of said rock-shaft independently of said individually operable means.

7. The arrangement described in claim 5 wherein means are provided for urging the rock-shaft toward a predetermined home position, each of said individually operable means including means to hold said rock-shaft in the position corresponding to an operated one of said operable means against the action of said returning means, said holding means becoming inoperative upon operation of another one of said individually operable means.

8. In a device of the kind described, a rotatable shaft, an axially adjustable and rotatable helically slotted shaft, coupling between said two shafts comprising means for engaging the helical slot and cooperating therewith to impart rotary movement to said first named shaft in accordance with axial displacements of the slotted shaft and means acting upon rotation of said slotted shaft for rotating said first named shaft in accordance therewith, a plurality of individually operable means acting upon selective operation thereof to effect the axial movement of said slotted shaft to respectively different desired positions and thereby effect the rotation of the first named shaft to different corresponding desired positions, and operable means for rotating said slotted shaft and thereby rotate said first named shaft in accordance therewith.

9. The arrangement described in claim 8 wherein each of said selectively operable means comprises a member adjustable with respect to said slotted shaft whereby each desired position may be adjustably predetermined.

ALEX KROES.